Dec. 3, 1968　　　　　　　　　G. ATTALI　　　　　　　　3,414,805
INDUCTION LOGGING APPARATUS HAVING FLOATING COILS
Filed May 1, 1967　　　　　　　　　　　　　　　　2 Sheets-Sheet 1
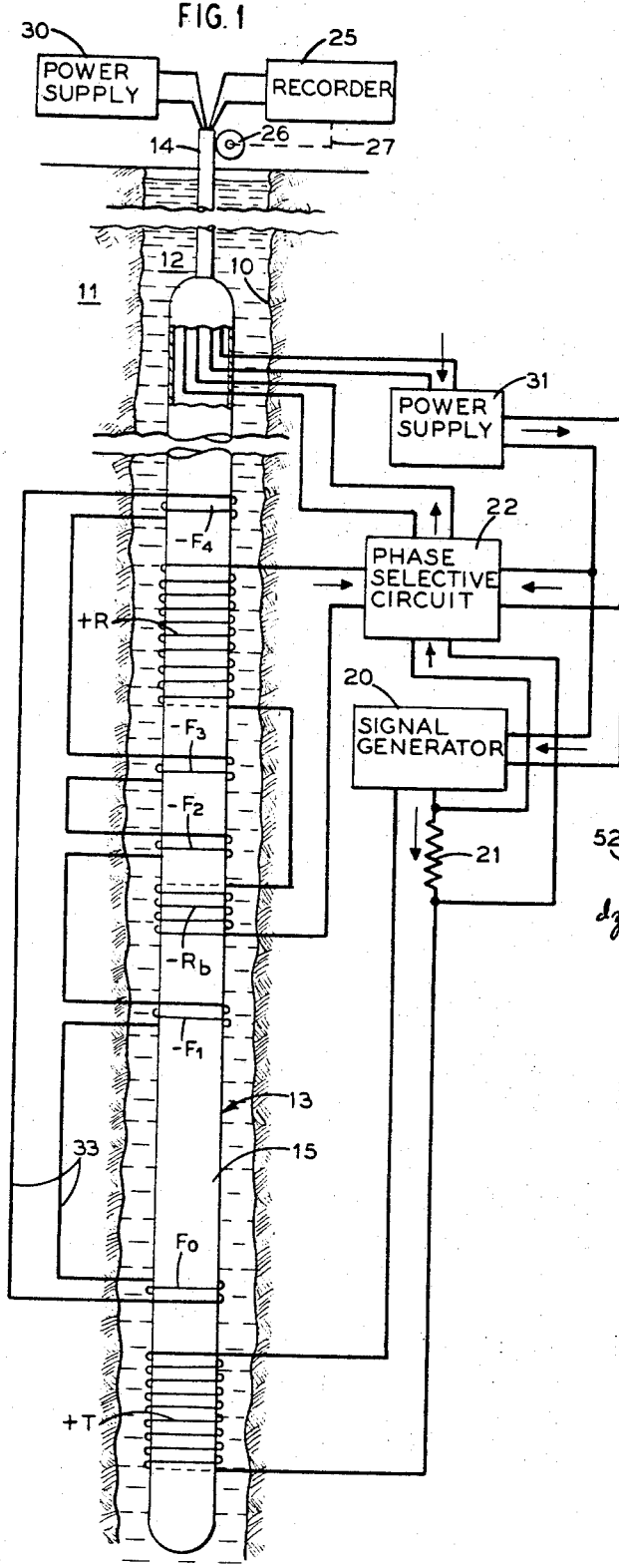
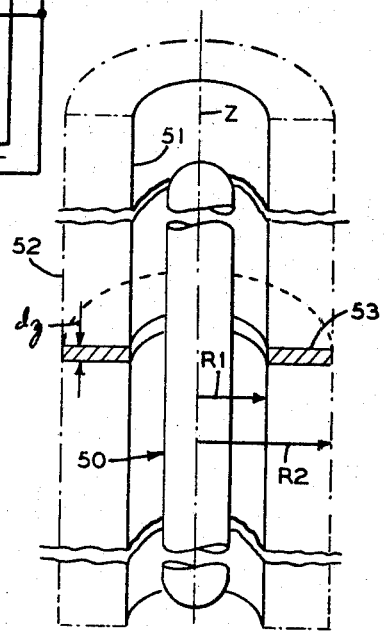
INVENTOR.
Georges Attali
BY
ATTORNEY

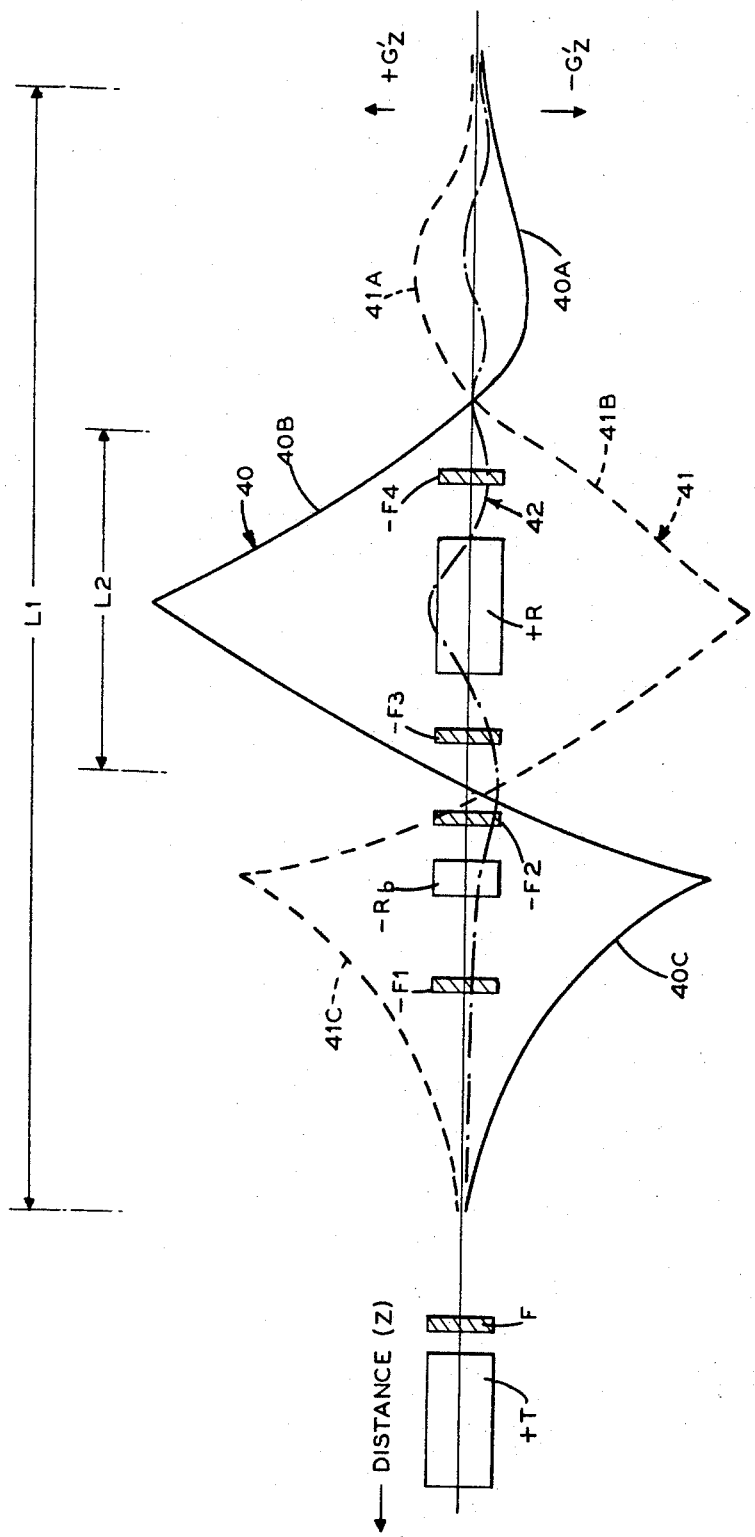

United States Patent Office 3,414,805
Patented Dec. 3, 1968

3,414,805
INDUCTION LOGGING APPARATUS HAVING FLOATING COILS
Georges Attali, Ridgefield, Conn., assignor to Schlumberger Technology Corporation, Houston, Tex., a corporation of Texas
Filed May 1, 1967, Ser. No. 635,139
14 Claims. (Cl. 324—6)

ABSTRACT OF THE DISCLOSURE

Electromagnetic induction type apparatus for investigating subsurface earth formations traversed by a borehole. A new coil construction technique is described. The technique makes use of "floating coils," that is, coils having no direct electrical circuit connection to the remainder of the coil system apparatus.

This invention relates to induction logging apparatus for investigating subsurface earth formations traversed by a borehole.

Induction logging apparatus is used to measure the electrical resistivity or electrical conductivity of the different subsurface earth strata adjacent an oil well type of borehole drilled into the earth. The resulting record or log of the measurements is useful for identifying and evaluating the different types of fluids, for example, oil, gas or water, that may be contained in the various subsurface formations. The present invention provides a new and improved technique for use in constructing such induction logging apparatus. This technique provides an added degree of flexibility to the construction of the coil system. Such increased flexibility can be used either to simplify the construction of the apparatus or to provide an improved response characteristic for the apparatus or some combination of both. In particular, the present invention enables the construction of coil systems having improved radial or vertical response characteristics with a minimum of increase in the complexity of construction.

The technique of the present invention enables the use of coils which do not require any electrostatic shielding. This technique also enables the provision of coils which, from an electrical standpoint, can be said to have fractional numbers of turns relative to other coils in the system, while from a mechanical standpoint such coils in fact have a whole number of complete turns.

In accordance with the present invention, there is provided induction logging apparatus comprising a coil system adapted for movement through a subsurface borehole and including at least one transmitter coil and at least one receiver coil longitudinally spaced from one another. The apparatus also includes circuit means for energizing the transmitter coil for inducing current flow in the surrounding subsurface material. The apparatus further includes circuit means coupled to the receiver coil for providing a signal dependent on the magnitude of the induced current flow in a portion of the surrounding subsurface material. The apparatus additionally includes a first auxiliary coil supported adjacent the transmitter coil and a second auxiliary coil supported adjacent the receiver coil. The apparatus further includes circuit means interconnecting the first and second auxiliary coils so that voltage induced in the first auxiliary coil will cause current to flow in the second auxiliary coil. The construction is such that neither this interconnecting circuit means nor either of the auxiliary coils has any direct electrical connection with either the transmitter or receiver coils or the circuit means associated therewith. As such, the auxiliary coils can be said to constitute a set of "floating coils."

For a better understanding of the present invention, together with other and further objects thereof, reference is had to the following description taken in connection with the accompanying drawings, the scope of the invention being pointed out in the appended claims.

Referring to the drawings:

FIG. 1 is a cross-sectional view of an earth borehole showing in a schematic manner a representative embodiment of the present invention;

FIG. 2 is a graph showing the geometrical factor response of the FIG. 1 apparatus with respect to a selected portion of the region surrounding the apparatus; and FIG. 3 is an explanatory sketch used to explain the meaning of the geometrical factor response shown in FIG. 2.

Referring to FIGURE 1 of the drawings, there is shown, in a cross-sectional manner, a borehole 10 passing downwardly through subsurface earth formations 11. The borehole 10 is filled with a drilling fluid or drilling mud 12. Shown suspended in the borehole 10 is an induction logging apparatus 13. This apparatus 13 is suspended by means of an armored multi-conductor cable 14 which extends to the surface of the earth and is connected to a suitable drum and winch mechanism (not shown) for raising and lowering the apparatus 13. The electrical circuits shown to the right of the borehole 10 are actually located inside of the upper portion of the housing of the apparatus 13.

The induction logging apparatus 13 includes an elongated cylindrical support member 15 constructed of non-magnetic, non-conductive material such as a plastic material. The support member 15 has a transmitter coil T and a pair of receiver coils R and $R_b$ supported thereon. Each of these coils is a cylindrical solenoid type of coil having several turns of insulated conductor wire wound around the support member 15, each coil being coaxial with the longitudinal center axis of the support member 15. A first pair of auxiliary coils, $F_1$ and $F_2$, are supported on the support member 15, one immediately above and the other immediately below the first receiver coil $R_b$. A second pair of auxiliary coils, $F_3$ and $F_4$, are supported on the support member 15, one immediately above and the other immediately below the second receiver coil R. A further auxiliary coil $F_0$ is supported on the support member 15 close to the transmitter coil T. Such coil $F_0$ has a high degree of inductive coupling with the coil T. Each of the auxiliary coils $F_0$, $F_1$, $F_2$, $F_3$ and $F_4$ is comprised of one or more turns of insulated conductor wire which is wound around the support member 15.

In practice, the induction logging apparatus 13 would further include a cylindrical sleeve member of non-magnetic, non-conductive material enclosing or covering the portion of the support member 15 upon which the various coils are mounted. For sake of simplicity, this outer sleeve member has been omitted from the drawing. Also, in practice the transmitter coil T and the receiver coils R and $R_b$ would be individually surrounded by electrostatic shielding members. As will be further discussed hereinafter, the various auxiliary coils $F_0$, $F_1$, $F_2$, $F_3$ and $F_4$ need not have such electrostatic shields. For sake of simplicity, the electrostatic shields for the main coils T, R and $R_b$ have been omitted from the drawing.

The induction logging apparatus 13 further includes circuit means for energizing the transmitter coil T for inducing current flow in the surrounding subsurface material. This circuit means includes a signal generator 20 connected by suitable insulated conductor wires to the transmitter coil T. A resistor 21 having a very small resistance value is connected in series wtih one of these conductor wires. The signal generator 20 produces a continuous sinusoidal output signal having a freqeuncy of, for example, 20 kilohertz.

The induction logging apparatus 13 also includes circuit means interconnecting the receiver coils R and $R_b$ for providing a signal dependent on the magnitude of the induced current flow in a portion of the surrounding subsurface material. This circuit means includes a phase selective circuit 22 and insulated conductor wires connecting a pair of input terminals thereof to the receiver coils R and $R_b$. The connection of these conductor wires is such that the receiver coils R and $R_b$ are connected in a series opposing manner. The relative numbers of turns on the receiver coils R and $R_b$ are chosen so that there is substantially zero net inductive coupling or direct mutual coupling between the transmitter coil T and the receiver coils R and $R_b$ taken as a whole.

There is supplied to a second pair of input terminals of the phase selective circuit 22 a phase reference signal produced by the voltage drop across the resistor 21. This phase reference signal is of the same phase as the current flowing in the transmitter coil T. The phase of the transmitter coil current will be used as the zero phase reference throughout the remainder of this description.

The phase selective circuit 22, under the control of the phase reference signal supplied thereto, serves to provide an output signal which is proportional to the magnitude of that component of the net receiver coil signal which is in phase (either zero degrees or 180 degrees) with the transmitter coil current. This output signal is supplied by way of insulated conductors in the cable 14 to a recorder 25 located at the surface of the earth. Within the recorder 25, these signals are recorded on a moving recording medium which is advanced in synchronism with the movement of the apparatus 13 through the borehole. This is accomplished by means of a measuring wheel 26 which engages the cable 14 and is rotated by movement thereof. Wheel 26 is coupled by a suitable mechanical linkage 27 to the film or chart paper advancing mechanism in the recorder 25.

Suitable electrical power for operating the downhole circuits is provided by a surface power supply unit 30 which is connected by way of insulated conductors within the cable 14 to a suitable power supply unit 31 contained in the downhole apparatus. Downhole power supply 31, in turn, supplies appropriate operating voltages to the signal generator 20 and the phase selective circuit 22.

Downhole units 20, 22 and 31 are physically located inside of the upper portion of the housing of the apparatus 13.

The induction logging apparatus 13 further includes auxiliary circuit means interconnecting the various auxiliary coils $F_0$, $F_1$, $F_2$, $F_3$ and $F_4$ in a series circuit manner. This auxiliary circuit means includes insulated conductor wires 33 which interconnect the various auxiliary coils so as to form a closed loop series circuit. An important feature of the present invention is the fact that the series circuit formed by the various auxiliary coils $F_0$, $F_1$, $F_2$, $F_3$ and $F_4$ and the conductor wires 33 is completely separated by means of electrical insulation material from the transmitter and receiver coils or any of the circuits connected thereto. In other words, there is no direct-current electrical circuit connection between this auxiliary circuit and any of the other electrical circuits contained in the downhole apparatus 13. Because of this feature, the set of auxiliary coils can be referred to as a set of "floating coils," where the term "floating" is used in the electrical sense.

The relative numbers of turns on the various auxiliary coils are chosen so that there is substantially zero net mutual inductance between the set of auxiliary coils taken as a whole and the set of receiver coils R and $R_b$ taken as a whole.

In the present embodiment of the invention, it is preferred that the current flowing through the auxiliary coils $F_0$, $F_1$, $F_2$, $F_3$ and $F_4$ be in phase (either zero degrees or 180 degrees) with the current flowing in the transmitter coil T. This is accomplished by constructing the series auxiliary circuit so that the net reactance thereof is much greater than the total circuit resistance introduced by the inherent resistance of the various wires forming the auxiliary coils and the conductor wires 33. In some cases, however, it may instead be more desirable to accomplish this result by placing additional resistors, inductors or capacitors at proper points in the auxiliary coil circuit.

Considering the operation of the apparatus thus far described, the induction logging apparatus 13 is moved through the borehole 10 at a more or less uniform rate. At the same time, the signal generator 20 is operated to supply sinusoidal current to the transmitter coil T. The resulting alternating magnetic flux field radiating from the transmitter coil T induces current flow in the surrounding subsurface material. This current normally flows in circular loops which encircle and which are concentric with the longitudinal center axis of the coil support member 15. The more conductive the subsurface material, the greater is the magnitude of the induced current flow therein. Conversely, the smaller the conductivity, the smaller the magnitude of the induced current flow The induced current flowing in the subsurface material, in turn, induces voltages into the receiver coils R and $R_b$. The magnitudes of these voltages are directly dependent on the magnitude of the current flow in the subsurface material. The components of the receiver coil voltages which are of interest are those components which are in phase with the current in the transmitter coil T. The net in-phase component is proportional to the conductance component of the electrical impedance of the subsurface material.

Since the receiver coils R and $R_b$ are connected in a series opposing manner and since they are proportioned to provide zero mutual inductance with the transmitter coil T, the direct flux coupling between the transmitter and receiver coils produces very little (desirably "zero") net signal across the two series-connected receiver coils. Any residual net signal component produced because of such direct flux coupling will be in phase quadrature (either 90 degrees or 270 degrees) with the current in the transmitter coil T.

The net voltage signal developed across the receiver coils R and $R_b$ is applied to the phase selective circuit 22. Circuit 22 responds thereto to produce an output signal which is proportional to the magnitude of the in-phase component of the net receiver coil signal. In other words, the phase selective circuit 22 rejects or discriminates against any signal components of quadrature phase.

The resulting output signal from the phase selective circuit 22 is then supplied by way of appropriate conductors in the cable 14 to the recorder 25 located at the surface of the earth. Recorder 25 operates to provide a continuous record or log of this signal as a function of the depth of the apparatus 13 in the borehole 10. The recorded signal values are directly proportional to the apparent electrical conductivity of the subsurface material which is within the investigating range of the downhole apparatus 13 at the times the signal values were obtained.

If desired, the recorder 25 may also include a reciprocal computer circuit for computing and recording a further signal proportional to the reciprocal of the original signal. This reciprocal signal is, thus, directly proportional to the apparent electrical resistivity of the subsurface material.

A feature of the present invention is the use of the auxiliary coils or floating coils $F_0$, $F_1$, $F_2$, $F_3$ and $F_4$. The auxiliary coil $F_0$ is closely coupled with the transmitter coil T. As a result, the transmitter coil induces in such coil $F_0$ an E.M.F. which is then used to energize the remainder of the auxiliary coils $F_1$, $F_2$, $F_3$ and $F_4$. The resulting current flowing through these other auxiliary coils is in phase with the current flowing in transmitter coil T. These other auxiliary coils $F_1$, $F_2$, $F_3$ and $F_4$ function as transmitter coils of relatively weak strength for inducing additional current flow components in the adjacent subsurface material.

The various coils shown in FIG. 1 are indicated as having either positive (+) or negative (−) polarities. The two main coils T and R are arbitrarily assumed to be of positive polarity. Thereafter any other receiver coil that would contribute the same polarity of voltage as the voltage contributed by the receiver coil R in response to current flow caused by the transmitter coil T is deemed to be of positive polarity. Otherwise, it is deemed to be of negative polarity. Similarly, any other transmitter coil that would cause the receiver coil R to produce a voltage component of the same polarity as that produced by the transmitter coil T is deemed to be of positive polarity. If of opposite polarity, then such other coil is deemed to be of negative polarity.

The first pair of auxiliary transmitter coils, $F_1$ and $F_2$, operate to induce an opposite polarity current flow in a limited portion of the subsurface material closely adjacent to the receiver coil $R_b$. This serves to cancel unwanted voltage components which would otherwise be induced in the receiver coil $R_b$ as a result of the normal current flow induced in this limited region. In a similar manner, the second pair of auxiliary transmitter coils, $F_3$ and $F_4$, serve to induce an opposite polarity current flow in the subsurface material located in a limited region closely adjacent to the receiver coil R. This opposite polarity current flow serves to cancel undesired voltage components which would otherwise be induced in the receiver coil R.

To better understand how the auxiliary coils function to provide an improved coil system response, reference is had to FIGURE 2 of the drawings. FIG. 2 is a graph showing how the coil system is affected by different selected portions of the subsurface material adjacent thereto. The abscissa axis is plotted in terms of distance along the longitudinal (vertical) axis of the coil system. The ordinate axis is plotted in terms of a limited vertical geometrical factor value $G'_z$.

The meaning of the limited vertical geometrical factor value $G'_z$ can be seen by referring to FIGURE 3, wherein element 50 represents the induction logging apparatus and element 51 represents the wall of the borehole. As is known, the response of an induction logging coil system to any given elemental ground loop portion of the surrounding subsurface material is proportional to the product of the conductivity ($c$) of the elemental portion and the geometrical factor ($g$) of the elemental portion. The geometrical factor depends exclusively on the geometry, that is, the dimension and position of the elemental portion with respect to the coil system. In the design of a coil system, the proportioning and location of the various coils determines the geometrical response pattern of the system.

The limited vertical geometrical factor $G'_z$ of present interest is the geometrical factor of a thin disc of subsurface material 53 which is coaxial with the longitudinal center axis of the coil system and which lies between radial distances $r_1$ and $r_2$, as measured from the center axis of the coil system. Radial distance $r_1$ corresponds to the radius of the borehole 51 and, for sake of an example, may be taken as being equal to four inches. (This is the nominal radius of the typical oil well borehole.) Radial distance $r_2$ corresponds to the radius of a cylindrical shell 52 and, for sake of an example, may be taken as being equal to eight inches. The vertical thickness of the disc 53 is taken as being equal to an elemental value $dz$. The disc 53 is assumed to have a conductivity of unity value. Also, it is assumed that all the remainder of the surrounding material has a conductivity of zero value, i.e., is not electrically conductive.

It is now desired to evaluate the response of the coil system as the elemental disc 53 is moved vertically past the coil system. This response is what is represented by the various curves depicted in FIG. 2. In particular, curve 40 represents the response, i.e., the output signal supplied to the recorder 25, as the elemental disc 53 is moved past the coil system for the case where the auxiliary coils $F_0$, $F_1$, $F_2$, $F_3$ and $F_4$ are not present. Curve 41 represents the additional response contributed by the addition of the auxiliary coils $F_0$, $F_1$, $F_2$, $F_3$ and $F_4$. Curve 42 represents the algebraic sum of curves 40 and 41 and thus represents the net response of the coil system with the auxiliary coils present.

By looking at the limited vertical geometrical factor curves of FIG. 2, it is possible to predict how the coil system will react to subsurface material lying within the cylindrical region between radii $r_1$ and $r_2$ (e.g., between four and eight inches). In the design of a coil system it is usually desired to make the coil system, as nearly as possible, completely insensitive to subsurface material lying in this four-to-eight inch region. For one thing, what is usually desired is to know the conductivity of the material located at a much greater radial distance from the borehole. For another thing, in practice the radius of the borehole is subject to considerable variation due to wobbling of the drilling bit, variations in the texture and composition of the different subsurface strata, etc. Since the conductivity of the drilling mud in the borehole is usually different from the conductivity of the adjoining earth formation variation in borehole radius would introduce undesired variations into the coil system measurements if the system is responsive to the material in and close to the borehole.

Assuming for the moment that the auxiliary coils $F_0$, $F_1$, $F_2$, $F_3$ and $F_4$ are not present, then one manner of rendering the coil system insensitive to material lying in the four-to-eight inch region would be to locate and proportion the various coils so that the over-all net response to this four-to-eight inch region is negligible. This was, in fact, done for the coil system represented by the transmitter coil T and the receiver coils R and $R_b$. In particular, with reference to curve 40 of FIG. 2, these three coils were located and proportioned so that the sum of the various negative areas under the curve 40, namely, those at 40a and 40c, would have a value approximately equal to the positive area under the curve 40 as indicated at 40b.

It will be observed, however, that this is only a gross or overall form of compensation. It will work and it will give the desired result only so long as the four-to-eight inch radial region adjacent the coil system is uniform over a longitudinal or vertical interval which is as long as or longer than the sensitive length of the coil system. This sensitive length is represented by the dimension $L_1$ in FIG. 2. This manner of compensation fails to provide complete compensation whenever there is present in the sensitive region of the coil system a shorter vertical interval having a different conductivity value than the remainder of the sensitive interval.

For example, assume that the borehole has a caved-in place at the location depicted by the dimension $L_2$ in FIG. 2. Further assume that this caved-in place extends out to the radial distance of eight inches. Also assume that the radius of the remainder of the borehole is at the four-inch value. Further assume that the drilling mud in the borehole is much more conductive than the adjacent earth formation. In such case, the highly conductive drilling mud located in the four-to-eight inch region at $L_2$ would give rise to a very large positive signal component across the two receiver coils (multiplication of the $G'_z$ values by the large conductivity value). This positive signal component would not be offset by the negative components introduced by the other portions of the four-to-eight inch radial region because these regions would be occupied by the less conductive earth formation material (multiplying the $G'_z$ values by a lower conductivity value).

The purpose of the auxiliary coils $F_0$, $F_1$, $F_2$, $F_3$ and $F_4$ is to provide a substantial improvement in this situation. In particular, the auxiliary coils $F_1$, $F_2$, $F_3$ and $F_4$ are proportioned and located so as to provide localized opposite polarity type responses in the intervals occupied by the receiver coils R and $R_b$. Roughly speaking, auxiliary coils $F_3$ and $F_4$ provide a negative response 41b in the vicinity of the receiver coil R which largely cancels the positive response 40b in this same region. Similarly, auxiliary coils $F_1$ and $F_2$ provide a positive response 41c in the vicinity of receiver coil $R_b$ which largely cancels the negative response 40c. The net response is indicated by curve 42.

It is noted that this added compensation is also not 100 percent complete, as is indicated by the net response curve 42. It is, however, a very substantial improvement and does render the coil system considerably less sensitive to localized borehole diameter variations of short extent. To the extent that the sum of the positive areas under the curve 42 cancels the sum of the negative areas under the curve 42, there is also provided the gross type of compensation previously considered.

In the representative embodiment shown in FIG. 1, the receiver coil $R_b$ is longitudinally spaced from the transmitter coil T such that the midpoints of these coils are separated by a distance of 48 inches. The midpoint of receiver coil R is spaced from the midpoint of receiver coil $R_b$ by a distance of 24 inches. The auxiliary coils $F_1$, $F_2$, $F_3$ and $F_4$ should be located relatively close to their corresponding ends of their corresponding receiver coils in order to have a minimum of effect with respect to subsurface material lying at a relatively large radial distance. For example, if it is desired that the auxiliary coils not have very much effect at radial distances larger than eight inches, then each auxiliary coil should not be spaced more than about eight inches from its end of its receiver coil. Thus, for example, the auxiliary coil $F_1$ should not be spaced more than about eight inches from the bottom end of receiver coil $R_b$. At the other extreme, none of the auxiliary coils should be spaced at a distance of less than about two inches from its end of its receiver coil. Otherwise, the positioning and proportioning of the auxiliary coil becomes very delicate and very sensitive with respect to its effect on the system.

Considering now the manner of determining the number of turns to be used on each of the auxiliary coils $F_1$, $F_2$, $F_3$ and $F_4$, it should be noted that the effective number of turns of each of these coils will be different from its actual number of turns. This is because less current will be flowing through the auxiliary coils. In comparing two different transmitter coils, they can be said to have the same strength or effectiveness whenever the following condition prevails:

$$N_1 \cdot I_1 \cdot D_1^2 = N_2 \cdot I_2 \cdot D_2^2 \quad (1)$$

where $N_1$ and $N_2$ denote the numbers of turns on the coils, $I_1$ and $I_2$ denote the currents flowing through the coils and $D_1$ and $D_2$ denote the diameters of the coils. In the present case, where all the coils are of the same diameter, the relationship of Equation 1 reduces to $$\frac{N_2}{N_1} = \frac{I_1}{I_2} \quad (2)$$

Assume, for example, that the current $I_2$ flowing in the auxiliary coils is one-fiftieth (1/50) of the current $I_1$ flowing in the transmitter coil T. If, for example, the design calculations indicate that a particular auxiliary coil should have 0.06 turns, then this number of turns must be multiplied by a factor of 50 to obtain the actual number of turns $N_2$ for this particular auxiliary coil. In this case, the actual number of turns for $N_2$ is equal to three. Thus, a 3-turn floating type coil has the same effect as a 0.06-turn conventional type transmitter coil.

This is an important advantage of the present invention because in obtaining the desired localized response cancellation, it will usually be the case that conventional type transmitter coils having fractional numbers of turns would be required. Once a coil begins to have less than one complete turn, however, it begins to cease to be a coil. By the use of a floating type coil, however, the desired result is obtained with a coil having a whole number of turns.

Two observations should be made concerning the phase of the current flowing in the auxiliary coils. One is that if the auxiliary coil current is in phase (either zero degrees or 180 degrees) with the transmitter coil current, then it is not mandatory that a zero mutual inductance relationship exist between the set of auxiliary coils and the set of receiver coils. This is because such an in-phase auxiliary coil current will produce by direct flux coupling with the receiver coils only a quadrature phase receiver coil component. Such quadrature phase component is then eliminated by the phase selective circuit 22. On the other hand, if a zero mutual condition does exist between the auxiliary coils and the receiver coils, then it is not mandatory that the auxiliary coil current be exactly in phase with the main transmitter coil current. This is because no signal components will be produced in the receiver coils by way of direct flux coupling. Instead, any quadrature auxiliary coil component can affect the receiver coils only by way of inducing a current flow component in the surrounding subsurface material. This will produce only a quadrature component in the receiver coils, this again being eliminated by the phase selective circuit 22. For maximum reliability, however, it is preferred that both conditions be sought to be met at the same time, namely, that the auxiliary coil current be made to be in phase with the transmitter coil current and that a zero mutual condition be made to exist between the auxiliary coils and the receiver coils.

An important advantage of the present invention is that it is not necessary to use electrostatic shields on the auxiliary coils. This results from the fact that there is no direct electrical circuit connection between the auxiliary or floating circuit and the remainder of the apparatus. This means that the auxiliary circuit is effectively isolated from any large capacitative couplings that may exist between the other circuit apparatus and the earth formations. The fact that such electrostatic shields are not required considerably simplifies the construction of the system, particularly where it is desired to place small auxiliary coils close to existing coils.

In the illustrated embodiment, the auxiliary or floating coils were used to improve the response of the coil system so that it would not be sensitive to small caved-in regions along the length of the borehole. Such floating coils are, however, not limited to this one particular usage. Instead, they can be used to provide other types of improvements in the coil system response pattern.

It should also be understood that the theory of reciprocity applies to the use of the floating coils. For example, for the illustrated embodiment, the characteristics of the coil system would remain the same if the transmitter coil T is instead used as a receiver coil and the receiver coils R and $R_b$ are instead used as transmitter coils. In other words, with respect to the main coils in the system, their functions can be interchanged and the system response will remain the same.

In the illustrated embodiment, the set of floating coils was used to cancel the undesired localized response peaks adjacent the receiver coils. The same technique can also be applied to systems where multiple transmitter coils are used in order to cancel undesired localized response peaks adjacent the transmitter coils. Thus, where multiple sets of both transmitter and receiver coils are used, two sets of floating coils can be used, one set of floating coils being constructed to cancel the undesired response peaks adjacent the receiver coils and the other set being used to cancel the undesired response peaks adjacent the transmitter coils.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. In induction logging apparatus for investigating subsurface earth formations traversed by a borehole, the combination comprising:

a coil system mounted on a support member and adapted for movement through the borehole and including at least one transmitter coil means and at least one receiver coil means longitudinally spaced from one another;

circuit means for energizing the transmitter coil means for inducing current flow in the surrounding subsurface material;

circuit means coupled to the receiver coil means for providing a signal dependent on the magnitude of the induced current flow in a portion of the surrounding subsurface material;

first auxiliary coil means supported adjacent the transmitter coil means;

second auxiliary coil means supported adjacent the receiver coil means;

and circuit means interconnecting the first and second auxiliary coil means so that voltage induced in the first auxiliary coil means will cause current to flow in the second auxiliary coil means, neither this interconnecting circuit means nor either of the first and second auxiliary coil means having any direct electrical connection with either the transmitter or receiver coil means or the circuit means associated therewith.

2. In indication logging apparatus for investigating subsurface earth formations traversed by a borehole, the combination comprising:

a coil system mounted on a support member and adapted for movement through the borehole and including at least one transmitter coil means and at least one receiver coil means longitudinally spaced from one another;

circuit means for energizing the transmitter coil means for inducing current flow in the surrounding subsurface material;

circuit means coupled to the receiver coil means for providing a measurement signal dependent on the magnitude of the induced current flow in a portion of the surrounding subsurface material, such measurement signal tending to include an undesired component whenever the subsurface material in a limited region adjacent a limited portion of the coil system closely adjacent the receiver coil means has a different value of conductivity than the subsurface material closely adjacent other portions of the coil system;

first auxiliary coil means supported adjacent the transmitter coil means and having a substantial degree of inductive coupling therewith;

second auxiliary coil means supported adjacent the receiver coil means;

and circuit means interconnecting the first and second auxiliary coil means so that voltage induced in the first auxiliary coil means will cause current to flow in the second auxiliary coil means, neither this interconnecting circuit means nor either of the first and second auxiliary coil means having any direct electrical connection with either the transmitter or receiver coil means or the circuit means associated therewith; the second auxiliary coil means being proportioned to induce an E.M.F. of appropriate polarity in the subsurface material in the limited region closely adjacent the receiver coil means for minimizing current flow in this limited region, thereby to minimize the sensitivity of the coil system to the material in this limited region.

3. In induction logging apparatus for investigating subsurface earth formations traversed by a borehole, the combination comprising:

a coil system mounted on a support member and adapted for movement through the borehole and including at least one transmitter coil means and at least one receiver coil means longitudinally spaced from one another;

circuit means for energizing the transmitter coil means for inducing current flow in the surrounding subsurface material;

circuit means coupled to the receiver coil means for providing a signal dependent on the magnitude of the induced current flow in a portion of the surrounding subsurface material;

first auxiliary coil means supported adjacent the transmitter coil means and having a high degree of inductive coupling therewith;

second auxiliary coil means supported adjacent the receiver coil means;

and circuit means interconnecting the first and second auxiliary coil means so that voltage induced in the first auxiliary coil means will cause current to flow in the second auxiliary coil means, neither this interconnecting circuit means nor either of the first and second auxiliary coil means having any direct electrical connection with either the transmitter or receiver coil means or the circuit means associated therewith.

4. In induction logging apparatus for investigating subsurface earth formations traversed by a borehole, the combination comprising:

a coil system mounted on a support member and adapted for movement through the borehole and including at least one transmitter coil means and at least one receiver coil means longitudinally spaced from one another;

circuit means for energizing the transmitter coil means for inducing current flow in the surrounding subsurface material;

circuit means coupled to the receiver coil means for providing a signal dependent on the magnitude of the induced current flow in a portion of the surrounding subsurface material;

first auxiliary coil means supported adjacent the transmitter coil means;

second auxiliary coil means supported adjacent the receiver coil means;

and auxiliary circuit means interconnecting the first and second auxiliary coil means so that voltage induced in the first auxiliary coil means will cause current to flow in the second auxiliary coil means, neither this auxiliary circuit means nor either of the first and second auxiliary coil means having any direct electrical connection with either the transmitter or receiver coil means or the circuit means associated therewith; the circuit formed by the auxiliary coil means and the auxiliary circuit means having impedances which are proportioned so that the current flowing in the second auxiliary coil means has a phase lying substantially along the same phase axis as the phase of the current flowing through the transmitter coil means.

5. In induction logging apparatus for investigating subsurface earth formations traversed by a borehole, the combination comprising:

a coil system mounted on a support member and adapted for movement through the borehole and including at least one transmitter coil and at least one receiver coil longitudinally spaced from one another;

circuit means for energizing the transmitter coil for inducing current flow in the surrounding subsurface material;

circuit means coupled to the receiver coil for providing a signal dependent on the magnitude of the induced current flow in a portion of the surrounding subsurface material;

a first electrically-insulated auxiliary coil supported adjacent the transmitter coil;

a second electricially-insulated auxiliary coil supported adjacent the receiver coil;

and insulated electrical conductor means electrically interconnecting the first and second auxiliary coils so as to form a closed loop series circuit, the voltage induced in the first auxiliary coil causing current to flow in the second auxiliary coil, neither this conductor means nor either of the first and second auxiliary coils having any direct electrical connection with either the transmitter or receiver coils or the circuit means associated therewith.

6. In induction logging apparatus for investigating subsurface earth formations traversed by a borehole, the combination comprising:

a coil system mounted on a support member and adapted for movement through the borehole and including at least one transmitter coil and at least one receiver coil longitudinally spaced from one another;

circuit means for energizing the transmitter coil for inducing current flow in the surrounding subsurface material;

circuit means coupled to the receiver coil for providing a signal dependent on the magnitude of the induced current flow in a portion of the surrounding subsurface material;

a first electrically-insulated auxiliary coil supported adjacent the transmitter coil;

a second electricially-insulated auxiliary coil supported adjacent the receiver coil;

and insulated electrical conductor means electrically interconnecting the first and second auxiliary coils so as to form a closed loop series circuit, the voltage induced in the first auxiliary coil causing current to flow in the second auxiliary coil, neither this conductor means nor either of the first and second auxiliary coils having any direct electrical connection with either the transmitter or receiver coils or the circuit means associated therewith; the impedance values in the closed loop series circuit being proportioned so that the net reactance value thereof is much greater than the net resistance value thereof.

7. In induction logging apparatus for investigating subsurface earth formations traversed by a borehole, the combination comprising:

a coil system mounted on a support member and adapted for movement through the borehole and including at least one transmitter coil and at least one receiver coil longitudinally spaced from one another;

circuit means for energizing the transmitter coil for inducing current flow in the surrounding subsurface material;

circuit means coupled to the receiver coil for providing a signal dependent on the magnitude of the induced current flow in a portion of the surrounding subsurface material;

a first auxiliary coil supported adjacent the transmitter coil;

second and third auxiliary coils supported adjacent the receiver coil, one immediately above and the other immediately below the receiver coil;

and circuit means interconnecting the first, second and third auxiliary coils so that voltage induced in the first auxiliary coil will cause current to flow in the second and third auxiliary coils, neither this interconnecting circuit means nor any of the auxiliary coils having any direct electrical connection with either the transmitter or receiver coils or the circuit means associated therewith.

8. In induction logging apparatus for investigating subsurface earth formations traversed by a borehole, the combination comprising:

a coil system mounted on a support member and adapted for movement through the borehole and including at least one transmitter coil and at least two receiver coils longitudinally spaced from one another;

circuit means for energizing the transmitter coil for inducing current flow in the surrounding subsurface material;

circuit means coupled to the receiver coils for providing a signal dependent on the magnitude of the induced current flow in a portion of the surrounding subsurface material;

a first auxiliary coil supported adjacent the transmitter coil;

a second auxiliary coil supported adjacent a first one of the receiver coils;

a third auxiliary coil supported adjacent a second one of the receiver coils;

and auxiliary circuit means interconnecting the first, second and third auxiliary coils so that voltage induced in the first auxiliary coil will cause current to flow in the second and third auxiliary coils, neither this auxiliary circuit means nor any of the auxiliary coils having any direct electrical connection with either the transmitter or receiver coils or the circuit means associated therewith.

9. Induction logging apparatus according to claim 8 wherein the net mutual inductance between the receiver coils and the auxiliary coils is substantially zero.

10. Induction logging apparatus according to claim 9 wherein the net mutual inductance between the transmitter coils and the receiver coils is substantially zero.

11. In induction logging apparatus for investigating subsurface earth formations traversed by a borehole, the combination comprising:

a coil system mounted on a support member and adapted for movement through the borehole and including at least two transmitter coils and at least one receiver coil longitudinally spaced from one another;

circuit means for energizing the transmitter coils for inducing current flow in the surrounding subsurface material;

circuit means coupled to the received coil for providing a signal dependent on the magnitude of the induced current flow in a portion of the surrounding subsurface material;

a first auxiliary coil supported adjacent a first one of the transmitter coils;

a second auxiliary coil supported adjacent a second one of the transmitter coils;

a third auxiliary coil supported adjacent the receiver coil;

and auxiliary circuit means interconnecting the first, second and third auxiliary coils so that voltages induced in the first and second auxiliary coils will cause current to flow in the third auxiliary coil, neither this auxiliary circuit means nor any of the auxiliary coils having any direct electrical connection with either the transmitter or received coils or the circuit means associated therewith.

12. Induction logging apparatus according to claim 11 wherein the net mutual inductance between the transmitter coils and the auxiliary coils is substantially zero.

13. Induction logging apparatus according to claim 12 wherein the net mutual inductance between the transmitter coils and the receiver coils is substantially zero.

14. In induction logging apparatus for investigating subsurface earth formations traversed by a borehole, the combination comprising:
- an elongated support member adapted for movement through the borehole;
- at least one transmitter coil and at least two receiver coils supported on the support member coaxial with the longitudinal axis thereof and longitudinally spaced apart from one another;
- circuit means for energizing the transmitter coil for inducing current flow in the surrounding subsurface material;
- circuit means interconnecting the receiver coils for providing a signal dependent on the magnitude of the induced current flow in a portion of the surrounding subsurface material;
- a first pair of auxiliary coils supported on the support member, one immediately above and the other immediately below a first one of the receiver coils;
- a second pair of auxiliary coils supported on the support member, one immediately above and the other immediately below a second one of the receiver coils;
- a further auxiliary coil supported on the support member close to the transmitter coil and having a substantial degree of inductive coupling therewith;
- and auxiliary circuit means connecting the various auxiliary coils in series with one another with polarities such that the signals produced in each receiver coil by the currents induced by its pair of auxiliary coils are of opposite polarity to the signals produced in such receiver coil by the current flow induced by the transmitter coil, both this auxiliary circuit means and the auxiliary coils having no direct electrical connection with either the transmitter or receiver coils or the circuit means associated therewith.

References Cited

UNITED STATES PATENTS

| | | | |
|---|---|---|---|
| 1,932,051 | 10/1933 | Steinert | 324—127 |
| 2,582,314 | 1/1952 | Doll | 324—6 |
| 2,689,329 | 9/1954 | Zimmerman | 324—5 |
| 2,723,375 | 11/1955 | Schuster | 324—6 |
| 3,051,892 | 8/1962 | Huston | 324—6 |
| 3,105,190 | 9/1963 | Norris | 324—6 |
| 3,259,836 | 7/1966 | Oshry | 324—6 |

RUDOLPH V. ROLINEC, *Primary Examiner.*

G. R. STRECKER. *Assistant Examiner.*